July 28, 1931.  E. WILDHABER  1,816,273

GEARING

Filed June 18, 1928   3 Sheets-Sheet 1

INVENTOR

Ernest Wildhaber

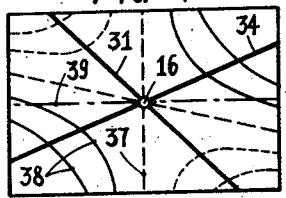
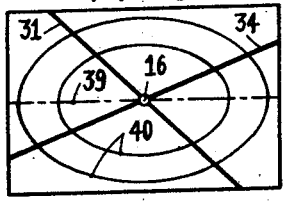
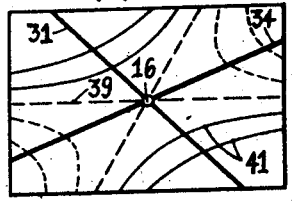
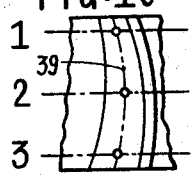
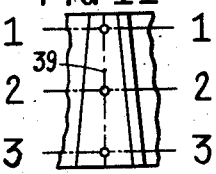
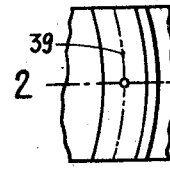
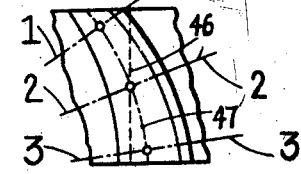
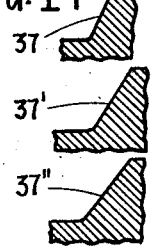
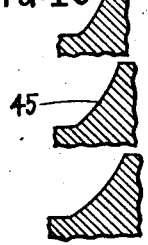
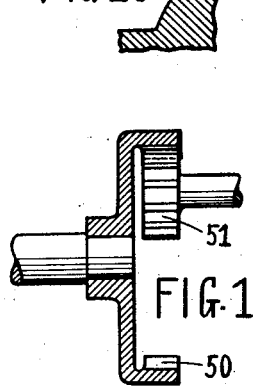
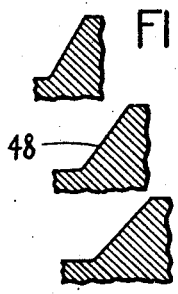
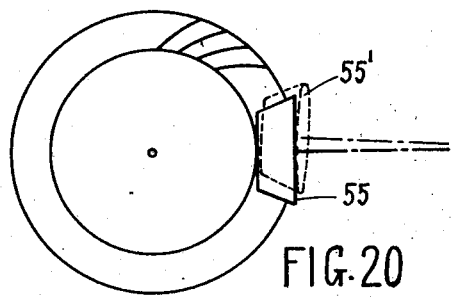
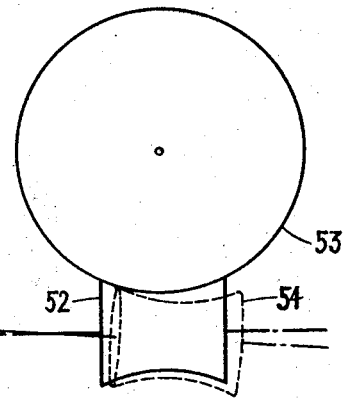
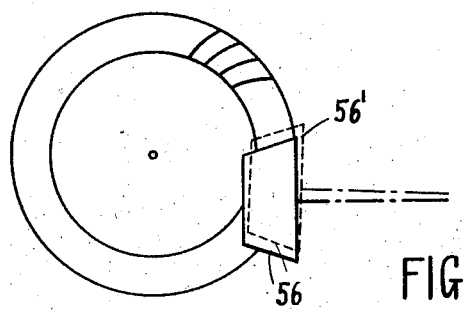

July 28, 1931.   E. WILDHABER   1,816,273
GEARING
Filed June 18, 1928    3 Sheets-Sheet 3
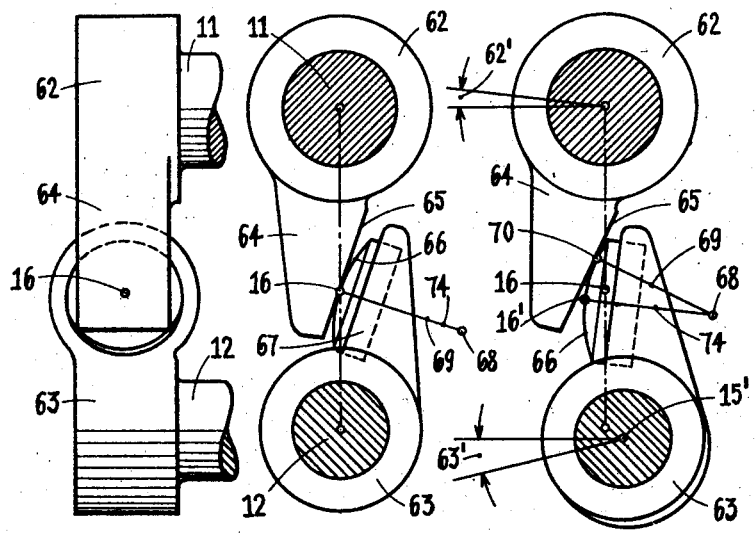

Patented July 28, 1931

1,816,273

UNITED STATES PATENT OFFICE

ERNEST WILDHABER, OF BROOKLYN, NEW YORK

GEARING

Application filed June 18, 1928. Serial No. 286,286.

The present invention relates to the tooth shape of gears, and particularly to the tooth shape of gears which deflect under load, such as nonrigidly mounted gears.

One object of the present invention is to provide a tooth form adapted to the deflection of a pair of gears under load, in a manner to be insensitive to said deflection.

Another object is to devise a tooth shape which permits any predetermined compound relative displacement of the bodies of a pair of gears, without affecting correct mesh of the gears. According to the present invention a tooth form may be provided on a pair of nonrigidly mounted gears, which is adapted to the nonrigid mounting of the gears and which is insensitive to it.

In usual gear practice gears of this character are frequently provided with a tooth form departing slightly from truly conjugate shape. Such departure is often called a modification of the teeth and is known to reduce the load capacity of the gears.

Another object of the present invention is to provide a tooth form for nonrigidly mounted gears, which is adapted to the deflection due to said nonrigid mounting, and which requires little or no modification. Another object is to provide a tooth form for gears which deflect under load, which is capable of a maximum load carrying capacity without undue wear and which operates with a maximum efficiency.

A further object is to provide a tooth form for nonrigidly mounted gears, which is capable of carrying load on the whole tooth surfaces under any possible amount of deflection, and while transmittting uniform motion.

Further objects will appear in the course of the specification and from recital of the appended claims.

The invention will be described with reference to the accompanying drawings, in which Fig. 1 is a diagrammatic view of a pair of gears with overhung mounting, the view being taken at right angles to the axes of said gears.

Fig. 1 and Fig. 2 are also illustrative of a method of determining a tooth shape in accordance with the present invention.

Fig. 7, Fig. 8 and Fig. 9 are further diagrams of basic tooth forms, in the nature of topographic maps of said tooth forms.

Fig. 10, Fig. 11, Fig. 12, Fig. 13 are plan views of basic tooth sides, the views being taken at right angles to the pitch surface of the basic member, for instance to the pitch plane of a rack or crown gear.

Fig. 14, Fig. 15, Fig. 16 and Fig. 17 are sections through the tooth sides shown in the Figures 10, 11, 12 and 13 respectively, the sections being taken along the lines 1—1, 2—2 and 3—3 of said respective figures.

Fig. 18 is a sectional view of an internal drive, which on account of the overhung mounting of the gears constitutes a favored application of the tooth forms in accordance with the present invention.

Fig. 19 is a diagrammatic view of a worm drive showing the worm in theoretical position and also, in dotted lines, in a deflected position under load, deflection being caused by nonrigid mounting. This figure illustrates another application of the present invention.

Fig. 20 and Fig. 21 are diagrams of a bevel gear drive and of a hypoid drive, showing in dotted lines the pinion in a position deflected under load relatively to the gear, and illustrative of other uses of tooth forms in accordance with the present invention.

Fig. 22 and Fig. 23 are corresponding views of parts substituted for gears, illustrative of a way of experimentally determining relative deflection under load.

Fig. 24 and Fig. 25 are views similar to Fig. 23, further illustrative of said experimental procedure.

Fig. 26, Fig. 27, Fig. 28 and Fig. 29 are auxiliary diagrams used in determining a tooth form adapted to the relative deflection of nonrigidly mounted gears under load, in accordance with the present invention.

Fig. 30 is a side view of a tool as may be used for producing one embodiment of a tooth shape in accordance with the present invention.

Fig. 31 is a front view of the tool shown in Fig. 30.

Fig. 32 is a front view of a tool of modified form.

Fig. 33 and Fig. 34 are corresponding views of another tool, suited to produce curved teeth shaped in accordance with the present invention.

Figure 1:
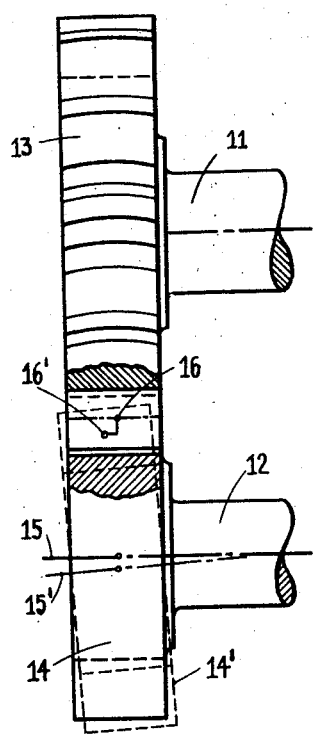
Figure 2:
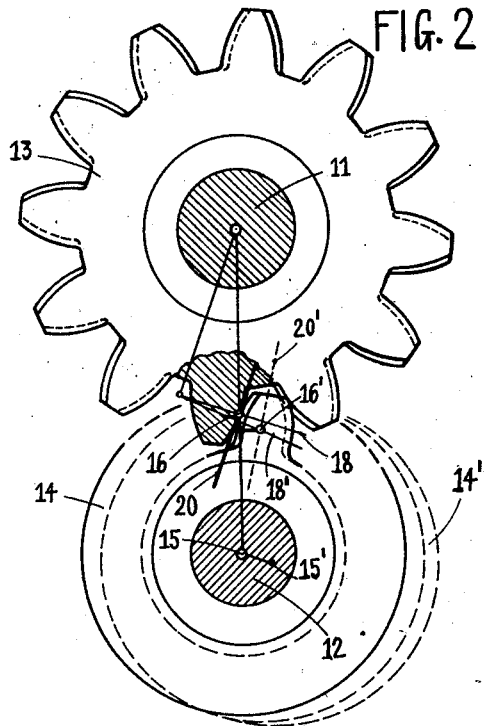
Fig. 2 is a diagrammatic view, partly in section, of the gears shown in Fig. 1, the view being taken along the axes of said gears.

In the Figures 1 and 2, the numerals 13 and 14 denote two gears rotatable on axes 11 and 12 respectively. In the instance illustrated both gears are journalled with overhung mounting. The position 14', shown in dotted lines, indicates a position which gear 14 may assume under load relatively to gear 13, on account of nonrigid mounting. The center line 15 of gear 14 is then in a deflected position 15', relatively to the gear 13.

The mathematical determination of a tooth shape will now be explained, which can stand such compound relative displacement of the two gear bodies while maintaining correct gear mesh.

A mean point of contact 16 is considered which is preferably located on the pitch circles of the undeflected gears. It is first supposed that the compound relative displacement of the gear bodies is known, be it that it has been computed with the known means of mathematics or that it has been determined experimentally by measurement, for instance as hereinafter described. In such relative displacement, the point of gear 14 which was contacting with point 16 of gear 13, has assumed a different position. It is shown in a position of mesh 16', that is to say in such location, in which contact may take place between the relatively displaced gears 14' and 13, in a manner that uniform motion is being transmitted. The position of mesh is characterized by the feature that a force extending in the direction of a tooth normal at a point of contact exerts turning moments on the two gears of a pair in proportion to the respective numbers of teeth, as is known.

When the gear bodies are substantially rigid bodies, and the displacement consists chiefly of the displacement of the shafts in the bearings, then evidently a force acting in the direction of the tooth normal 18' at point 16' exerts the same turning moment on the displaced gear 14 (14') as an equal force acting at point 16 in the direction of tooth normal 18 exerts on gear 14 in its undeflected position. In consequence the turning moments exerted on gear 13 by equal forces acting along normals 18 and 18' are also equal, inasmuch as they must be in a constant proportion to the turning moments exerted on gear 14 in its undeflected position and in its deflected position 14'.

To determine the position of mesh of point 16', its normal 18' may be swung on the displaced center line 15', until said normal fulfills the above said requirement. This position can be determined with the known methods of mathematics. In general it is found that normal 18' is inclined to the plane of the drawings, Fig. 2.

We will now consider the tangential plane 20 at point 16 of gear 13. When tooth contact between gear 13 and displaced gear 14' is made at point 16', the said tangential plane assumes a position as indicated in dotted lines 20', which passes substantially through point 16'. The inclination of the tooth perpendicular 18' with respect to the said tangential plane may then be determined with the known methods of mathematics.

Figure 3:
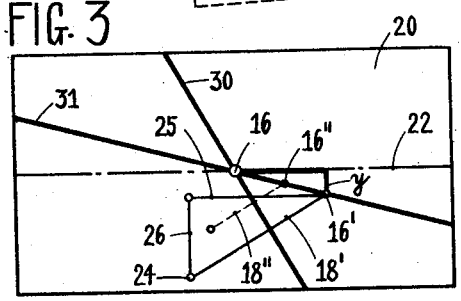
Fig. 3 and Fig. 4 are auxiliary diagrams, explanatory of steps taken in determining a tooth shape.

In Fig. 3 a portion of the tangential plane 20, is shown in an enlarged scale laid down to the plane of the drawings. Point 16 is located on the pitch line 22, and point 16' is located as determined in the manner described with reference to Figures 1 and 2. Inasmuch as the tangential plane coincides with the plane of the drawings, Fig. 3, the perpendicular 18 at point 16 is also perpendicular to the plane of the drawings, whereas the perpendicular 18' stands obliquely to it. Point 24 can be considered as the projection of a point of perpendicular 18', and 25, 26 can be considered as the coordinates of said point with respect to point 16'.

As hereinbefore stated, the actual tooth surface of gear 13 may be any surface, which contains perpendiculars 18 and 18' at the points 16 and 16', or also intermediate perpendiculars 18'' at intermediate points 16''.

In order to define the tooth surfaces more explicitly, reference may be had to a theory of curvature surfaces. A curvature surface adjacent a point such as point 16 is known in mathematics as a surface of such relation to the surface which it approximates, that any section laid through a point 16 of the curvature surface contains the same radius of curvature as the corresponding section of the original surface. The curvature surface may be defined through the ordinates of its individual points above or below the tangential plane at point 16. In Fig. 3 and in the subsequent Figures 4 to 9 the said tangential plane coincides with the plane of the drawings. It can be shown with known means of mathematics, that the ordinates of the individual points of a surface of curvature, or the elevation of said points above or below the plane of the drawings, can be considered as the added ordinates of two cylindrical surfaces which are tangent to the plane of the drawings. The said two cylindrical surfaces contact with the plane of the drawings along generatrices 30, 31, or 34, 31, which pass through point 16. Inasmuch as any perpendicular to a cylindrical surface is projected at right angles to its generatrices, a perpendicular 18' (Fig. 3) may be embodied as the perpendicular of a cylindrical surface, which contacts with the plane of the drawings along a generatrix 30 drawn at right angles to the projected perpendicular 18'. The radius of said cylindrical surface is so determined, that the given inclination of perpendicular 18' is effected, as will be readily understood by those familiar with mathematics.

It is further seen that any cylindrical surface contacting with the plane of the drawings along a line 31 will not affect the angularity of the perpendicular 18' at point 16'. Line 31 is herein the line connecting the points 16 and 16'. The ordinates of the tooth surface of gear 14 with respect to the tangential plane at point 16 can therefore be considered as the sum of the ordinates of two cylindrical surfaces, namely of a surface of fixed radius extending along line 30, and of a cylindrical surface of any radius, extending along line 31. The superposition of such ordinates will be further described hereafter. Fig. 3 thus illustrates the tooth surface of gear 13. The corresponding tooth surface of mating gear 14 may be determined from the given tooth shape of gear 13 with the known methods of gear theory.

Figure 4:
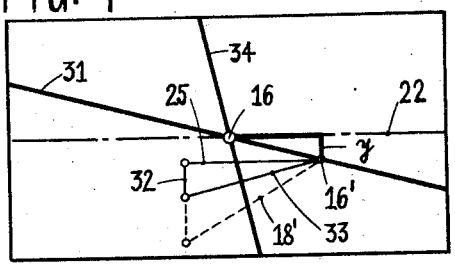
Figure 5:
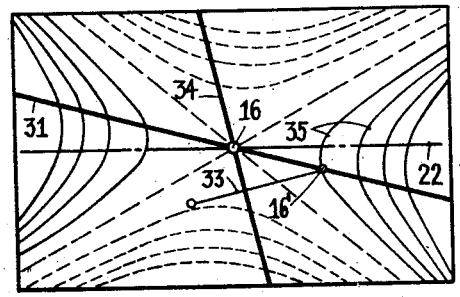
Fig. 5 and Fig. 6 are diagrams of basic tooth forms determined in accordance with the present invention. The said diagrams are in the nature of topographic maps, with the tangential plane in a mean pitch point as the plane of the drawings, and with lines of equal altitude or elevation denoting the distance from said plane of the points of said basic tooth forms.
Figure 6:
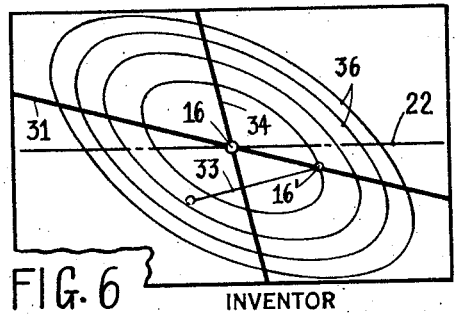

In the production of the gears it is frequently desirable to know the tooth shape of the basic rack or broadly of a basic member rather than the tooth shapes of the individual gears. The determination of such tooth shape is indicated in Fig. 4. Within the close approximation afforded through the use of curvature surfaces, the tooth perpendicular 33 of the rack surface at point 16' may be obtained from the perpendicular 18' through rotation about a line 25 of the drawings plane by an angle, whose arc measure equals $$\frac{y}{r \cdot \sin a},$$

when the tangential plane at point 16 extends parallel to the axes of the gears 13 and 14, as may be derived with known mathematics. Herein $r$ denotes the pitch radius of gear 13 and $a$ the pressure angle of the tooth at point 16. Or the shape of the rack surface may be determined with known methods as conjugate to a known gear surface, namely to the surface of gear 13.

The tooth normal 33 of the rack surface contains the same component 25 as the tooth normal 18' of the surface of gear 13, and a component 32 which is reduced as compared with component 26 of the said surface.

The rack surface can be defined in a similar manner as the surface of gear 13 in Fig. 3, namely through two cylindrical surfaces extending along lines 31 and 34, line 34 being perpendicular to projected normal 33.

The tooth surface of a rack will now further be illustrated in the manner of topographic maps, by drawing lines of equal altitude or elevation of the points of its surface from the tangential plane in point 16. In points of such lines, the algebraic sum of the distances from said plane of the two cylindrical surfaces is constant. In the instance illustrated in Fig. 5 the lines of equal altitude are hyperbolas 35, namely when the ordinates of the two individual cylindrical surfaces are disposed on opposite sides of the plane of the drawings. When the two cylindrical surfaces whose ordinates compose the tooth surface of the rack are disposed on the same side of the tangential plane at point 16, the lines of equal altitude are found to be ellipses 36, see Fig. 6.

The Figures 7, 8 and 9 illustrate specific forms of rack teeth. In Fig. 7 one asymptote 37 of the hyperbolas 38 is perpendicular to the pitch line 39 of the tooth. In Fig. 8 one principal axis of the ellipses 40 coincides with the pitch line 39. And in Fig. 9, one asymptote of the hyperbolas 41 coincides with the pitch line 39. When a principal axis of ellipses 40 or of hyperbolas coincides with the pitch line, this indicates tooth surfaces of the shape of a surface of revolution. In this case the pressure angles are found to be constant along the pitch line 39. In all other cases, however, such as in the instances illustrated in Fig. 7 and Fig. 9, the pressure angle changes along the pitch line.

The map shown in Fig. 7 indicates a basic tooth form, containing teeth of lengthwise curvature, that is to say curved pitch lines 39 and straight tooth profiles 37 of changing pressure angle, or changing inclination with respect to the tangential plane at point 16. Tooth sides of this character are further indicated in Fig. 10 and in the sections Fig. 14. The latter clearly show the straight profiles 37 of the basic tooth form. The profile 37 of the section shown at the top of the three sectional figures is seen to contain the smallest pressure angle, and illustrates a section along lines 1—1 of Fig. 10. The profiles 37' and 37'' have increasingly larger pressure angles, corresponding to sections 2—2 and 3—3 respectively.

Fig. 11 and the sectional Figures 15 illustrate the general shape of a tooth form such as indicated by the map, Fig. 9. The pitch lines 39 of the teeth are straight, and the transverse profiles 45 of the basic member are in general curved and containing a changing profile inclination or pressure angle. The top figure of the Figures 15 is a section along lines 1—1 of Fig. 11 and illustrates the profile 45 of smallest pressure angle. The other Figures 15 indicate profiles 45 of increasing pressure angle or inclination angle.

Fig. 12 and sectional Figure 16 illustrate in a general manner a tooth form of a character indicated in Fig. 8, in the nature of a surface of revolution.

Fig. 13 and Figures 17 illustrate a shape of a tooth, which in its general direction is inclined to the straight generatrices (46) of its pitch surface. The pitch line 47 of the illustrated tooth is curved, and the tooth profiles 48 have a changing inclination, or pressure angle, the pressure angle decreasing in the direction of the increasing inclination of the pitch line 47.

In the Figures 18, 19, 20, 21 some fields of application of the present invention are illustrated. They are especially such fields, where the relative displacement of a pair of gears under load is considerable enough, that it would hamper the good performance of gears provided with standard tooth shapes. Internal drives, as diagrammatically illustrated in Fig. 18, have a comparatively large relative deflection between the two gears of the pair on account of the overhung mounting. Generally the gear (50) as well as the pinion 51 are supported only on one side. Fig. 19 diagrammatically illustrates a worm drive, with the worm shown in full lines 52 in the undeflected position relatively to worm wheel 53. An exaggerated position of the worm under load is shown in dotted lines 54.

In the Figures 20 and 21 a bevel drive and a hypoid drive are indicated, with the undeflected positions of the pinions 55, 56 shown in full lines, and deflected positions of said pinions relatively to the gears shown in dotted lines 55', 56'. Here also tooth surfaces may be determined with the method disclosed, in such manner that they are insensitive to the compound relative displacement experienced by the gears under load.

The said compound relative displacement may be computed, or it may be measured. One way of determining such displacement experimentally will now be described with reference to the Figures 22 to 29.

In Fig. 22 and Fig. 23 a pair of gears rotatable on axes 11, 12 is replaced by two members 62, 63. Member 62 contains a projection 64, containing a plane side 65, which is equally positioned as the tangential plane 20 at point 16 of gear 13. Member 62 is prevented from turning in a manner most closely approximating the transmission of torque through shaft 11 by gear 13 and is fixed in such a position, that at zero load it makes contact at point 16 with a spherical surface 66 of member 63. The said spherical surface forms part of a portion 67 which is inserted into member 63. Spherical surface 66 has a center 68 and a radius 69.

Torque is then transmitted through shaft 12 to member 63, in the manner it is transmitted to gear 14, and its amount is equal to the average amount or the full amount of torque transmitted through gear 14. Under such torque, the two members 62, 63 are displaced relatively to each other, as is indicated in Fig. 24. Member 62 is turned through an angle 62' under load, and member 63 is turned on the deflected center 15' through an angle 63'. The contact between the members 62 and 63 then shifts from point 16 to a point 70.

To obtain further information of the relative displacement of the two gears 13 and 14 under load, a spherical surface 72 of different radius is substituted for the spherical surface 66, as indicated in Fig. 25. Again the two members 62 and 63 are placed under torque, and the point of contact between member 62 and spherical surface 72 traces another path on the plane side 65.

The Figures 26 to 29 are views of said plane side 65, laid down in the plane of the drawings. In Fig. 26 the path of the point of contact on plane 65 corresponds to the spherical surface 66 shown in the Figures 23 and 24, and extends along the dotted lines from point 16 to point 70. In Fig. 27, the path along the dotted lines from point 16 to point 73 corresponds to the spherical surface 72 of larger radius, as indicated in Fig. 25. Both Fig. 26 and Fig. 27 are obtained from equal amounts of torque transmitted, and therefore from equal or substantially equal compound relative displacements. A relative displacement can be considered composed of a translation of the point of the spherical surface, which coincides with point 16 at zero load, and of a small rotation about an axis extending in plane 65 or approximately in plane 65. This small rotation has the effect that the perpendicular 74 at point 16' is swung into an angular position to plane 65, (Fig. 24), so that the sphere center 68 is projected into point 70, which is also the point of contact between plane 65 and spherical surface 66.

The translations 16—16' are the same in the cases referred to by Fig. 26 and Fig. 27. Moreover the above said rotation or angular tilt is the same. The normal 74 is projected in either case in the same direction and passes in either case through the same point 16'. This direction can be located from the known points 16, 70 and 73 in Fig. 26 and Fig. 27, by plotting point 70 also in Fig. 27, and by connecting the points 73 and 70. Point 16' may be located by prolonging line 73—70 and by plotting point 16' at such a distance on said prolonged line, that the distances 70—16' and 73—16' are proportional to the radii of the spherical surfaces 66 and 72. The sine or arc of the inclination angle of the normal 74 at point 16' relatively to the direction of a normal at point 16 equals the distance 16'—70 divided by the length of the radius 69 of the spherical surface 66.

In order to obtain the same information on the shape of a tooth surface as furnished by Fig. 3, the normal projected into line 16'—73, Fig. 28, is turned to such angular position as corresponds to a position of mesh. This may be done with the use of the known laws of kinematics. When the displacement is such that it can be considered as a displacement of rigid bodies, and when the plane 66 is parallel to the axis 11, the said normal may be turned about an axis parallel to pitch line 22 up to a position, in which a force acting in the direction of said normal exerts a turning moment on member 62 or gear 13 equal to the turning moment exerted by an equal force acting at point 16 in the direction of the normal line.

Instead of determining the tooth shape of gear 13, it is usually preferable to determine the tooth shape of a basic member, in the present instance of a basic rack. In this case the said normal may be turned in the same manner as described up to a position, in which a force acting on said rack in the direction of said normal contains a propelling component equal to the propelling component of an equal force acting at point 16 in the direction of the normal line. This position is illustrated in Fig. 28. The normal has assumed then a position 16'—73' parallel to the pitch line 22.

When the relative displacement between the two members 62, 63 is such that it cannot be considered as a displacement of rigid bodies, that is to say when the deformation is such that equal forces acting along normal 74 on the undeflected member 63 (Fig. 23) and on the deflected member 63 (Fig. 24), produce somewhat different moments, then the determination of the tooth shape is somewhat modified. In case the moment exerted on the deflected member 63 is smaller than the one exerted on the undeflected member 63, the normal is turned further, namely so that its point 73 not only assumes a position 73' but a lower position 73''. The said position may be determined from the requirement that the moment exerted on gear 13 and the propelling force exerted upon the rack should be in a constant proportion, before and after deflection has taken place.

In any case, tooth forms insensitive to a given relative displacement are characterized through the feature, that they contain a specific normal at point 16'. From this information, tooth surfaces may be constructed in the manner described with reference to Fig. 3 and Fig. 4.

According to the present invention tooth shapes may be determined, which are insensitive or substantially insensitive to any given or desirable displacement of the gear bodies, provided naturally that the gear teeth remain in mesh. It is not necessary that such displacement occurs on account of nonrigid mounting or on account of elasticity in the shafts, gear bodies and teeth. The described method holds good for any displacement, also for instance for displacements effected in a positive manner.

Some of the tooth shapes provided are not novel in themselves, but in the combination with a specific performance. The invention then resides in the relative proportions. This holds true especially, when the basic tooth forms are surfaces of revolution.

Tooth forms of changing pressure angle, such as may be provided in accordance with the present invention, can be produced in various manners, two of which will now be briefly discussed.

Fig. 30 and Fig. 31 illustrate a planing tool 80, which may be reciprocated in the direction of its axis 81 and at the same time oscillated on said axis. The tool 82 proper is rigidly secured to tool holder 83. It contains a cutting edge 84, whose point 85 is moved along axis 81, while the cutting edge assumes various angular positions on account of the above said oscillation, for instance the position indicated in dotted lines 84'. Fig. 32 illustrates a tool of curved profile 86, which may be moved in the same manner as the cutting edge 84.

The surface described by a cutting edge extends in either case along a straight line, namely along the axis 81 of the tool, and contains a changing profile inclination or pressure angle. Preferably the change of pressure angle is constant along the described tooth. The tooth surface is then a helicoidal surface. It may be used as the tooth form of a basic member, such as a rack. Gear teeth are then generated by slowly rolling a gear blank on the pitch surface of said basic rack or basic member, past the helicoidal surface described by the reciprocating cutting edge. Teeth produced in this manner are straight in longitudinal direction.

Curved teeth having changing pressure angles may be produced for instance with a tool illustrated in Fig. 33 and Fig. 34. It contains a cutting edge 88, forming part of a blade 89 which is rigidly secured to cutter body 90. The latter is reciprocated in a helicoidal path along its axis 91, in such manner that the central point 92 of the cutting edge describes a helix 93. A helix can be closely approximated by a circular arc, as is well known. Adjacent point 92 its curvature circle lies in a plane 94 and has a center 95. On account of the inclination of the axis of rotation to the plane of said circle, cutting edge 88 describes a surface, whose profiles have a changing inclination to the said plane, which results in pressure angles changing lengthwise of the teeth.

It is understood that during the return stroke the cutting edge is lifted away from the tooth surface operated on, as usual. Inasmuch as many various means are known for effecting this purpose, further reference to this feature has been omitted.

Many modifications may be made in my invention without departing from its spirit. For definition of its scope it is relied upon the annexed claims.

What I claim is:

1. A pair of gears bodily movable relatively to each other, the relative displacement of the gear bodies consisting of a translation along a straight line and of a rotation on an axis angularly disposed to the direction of the axes of both gears of said pair, a tooth surface of one of said gears containing tooth normals which coincide with the tooth normal of a mean point of a mating tooth surface in two different bodily positions of said gears, coincidence of said tooth normals corresponding to turning positions in which a constant load directed along said coinciding tooth normals exerts the same turning moment on said one gear in said different bodily positions, so that said gears are insensitive to said bodily displacement and suited to transmit uniform motion irrespective of the relative positions of the gear bodies.

2. A pair of gears bodily movable relatively to each other, the relative displacement of the gear bodies consisting of a translation and of a rotation on an axis angularly disposed to both gear axes, a tooth surface of one of said gears containing tooth normals which coincide with the tooth normal of a mean point of a mating tooth surface in the two extreme occurring bodily positions of said gears, coincidence of said tooth normals corresponding to turning positions of said gears in which a constant load directed along said coinciding tooth normals exerts the same turning moment on said one gear in said different bodily positions.

3. A pair of gears suited to mesh with line contact and bodily movable relatively to each other under load, the relative displacement of the gear bodies increasing with increasing load and consisting of a translation and of a rotation on an axis other than the axes of said gears, a tooth surface of one of said gears containing tooth normals which coincide with the tooth normal of a mean point of a mating tooth surface in a plurality of bodily positions of said gears, coincidence of said tooth normals corresponding to turning positions in which a constant load directed along said coinciding tooth normals exerts the same turning moment on said one gear in said different bodily positions, so that said gears are suited to transmit uniform motion in various bodily positions corresponding to various loads.

4. A pair of gears bodily movable relatively to each other under load, the relative displacement of the gear bodies comprising a displacement of the gear center lines affecting the distance between said gear center lines and also affecting the angle between the directions of the gear center lines, a tooth surface of one of said gears containing tooth normals which coincide with the tooth normal of a mean point of a mating tooth surface in two different bodily positions of said gears, coincidence of said tooth normals corresponding to turning positions in which a constant load directed along said coinciding tooth normals exerts the same turning moment on said one gear in said different bodily positions, so that said gears are suited to transmit uniform motion in various bodily positions corresponding to various transmitted loads.

5. A pair of gears bodily movable relatively to each other, the relative displacement of the gear bodies comprising an angular displacement on an axis offset from and angularly disposed to the axes of both gears of said pair, the directions of the tooth normals of mating tooth surfaces being so related to each other that the central portions of mating tooth surfaces are suited to transmit uniform motion in a plurality of different bodily positions.

6. A pair of gears bodily movable relatively to each other and mounted on substantially parallel axes, the relative displacement of the gear bodies comprising an angular displacement on an axis angularly disposed to the direction of said parallel axes, the directions of the tooth normals of mating tooth surfaces being so related to each other that the central portions of mating tooth surfaces are suited to transmit uniform motion in a plurality of different bodily positions.

7. A pair of nonrigidly mounted gears bodily movable relatively to each other under load, the relative displacement of the gear bodies comprising an angular displacement of the gear centers and a translation affecting the distance between said centers, the directions of the tooth normals of mating tooth surfaces being so related to each other that the central portions of making tooth surfaces are suited to transmit uniform motion in the various bodily positions of the gears.

8. A pair of gears bodily movable relatively to each other to compound relative displacements, the directions of the tooth normals of mating tooth surfaces being so related to each other that the central portions of mating tooth surfaces are suited to transmit uniform motion in the various relative positions of the gear bodies.

9. A pair of gears having pitch surfaces suited to roll on each other without sliding, said gears being bodily movable relatively to each other under load to compound relative displacements, the directions of the tooth normals of mating tooth surfaces being so related to each other that the central portions of mating tooth surfaces are suited to transmit uniform motion in the relative positions of the gear bodies assumed under various loads.

10. A pair of gears, at least one of which is journalled with overhung mounting, said gears being bodily movable relatively to each other under load and containing tooth forms suited to mesh with line contact and insensitive to the displacements experienced by the gear bodies under various loads, a tooth surface of one of said gears containing tooth normals which coincide with the tooth normal of a mean point of a mating tooth surface in different bodily positions of said gears, coincidence of said tooth normals corresponding to turning positions of said gears in which a constant load directed along said coinciding tooth normals exerts the same turning moment on said one gear in said different bodily positions.

11. A pair of gears, at least one of which is journalled with overhung mounting, said gears being bodily movable relatively to each other under load, and containing teeth of such lengthwise curvature as to make the active tooth surfaces insensitive to the compound displacement experienced by the gear bodies under load, said teeth being suited to mesh with line contact.

12. A pair of gears, at least one of which is journalled with overhung mounting, said gears being bodily movable relatively to each other under load, and containing teeth with such changing pressure angles as to make the active tooth surfaces insensitive to the compound displacement experienced by the gear bodies under load, said teeth being suited to mesh with line contact.

13. A pair of gears, at least one of which is journalled with overhung mounting, said gears being bodily movable relatively to each other under load, and containing curved teeth of changing pressure angle suited to mesh with line contact, the curvature of the teeth and the rate of change of the pressure angles being so selected as to make the active tooth surfaces insensitive to the compound relative displacement experienced by the gear bodies under load.

14. A pair of gears, at least one of which is journalled with overhung mounting on an axis substantially parallel to the axis of the other gear of said pair, said gears being bodily movable relatively to each other under load, and containing teeth curved lengthwise in a manner to make said gears insensitive to the compound relative displacement experienced under load.

ERNEST WILDHABER.